Sept. 15, 1931.  R. BARTHELEMY  1,823,779
ELECTRICAL SYNCHRONOUS BRAKING DEVICE
Filed Oct. 6, 1930
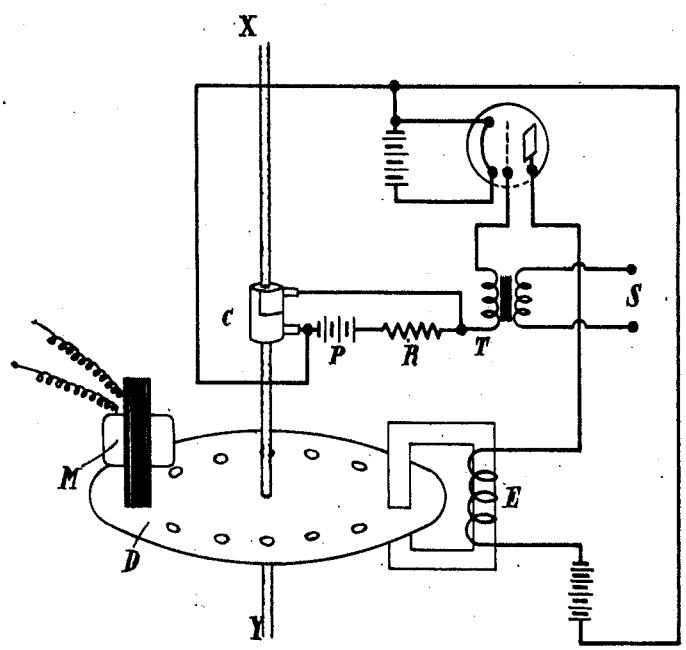
Inventor
René Barthelemy
by Wilkinson & Mawhinney
Attorneys.

Patented Sept. 15, 1931

1,823,779

UNITED STATES PATENT OFFICE

RENÉ BARTHELEMY, OF FONTENAY-AUX-ROSES, SEINE, FRANCE, ASSIGNOR TO COMPAGNIE POUR LA FABRICATION DES COMPTEURS ET MATERIAL D'USINES A GAZ, OF MONTROUGE, SEINE, FRANCE, A JOINT-STOCK COMPANY OF FRANCE

ELECTRICAL SYNCHRONOUS BRAKING DEVICE

Application filed October 6, 1930, Serial No. 486,768, and in France April 8, 1930.

The present invention relates to a synchronous braking device for use in controlling the speed of a rotating member.

I have already proposed in an application Ser. No. 443,187 filed April 10, 1930 for "Devices for synchronizing electric motors" to obtain a braking action functional of the frequency of the synchronizing oscillation and I have described in this application several ways of carrying this principle into effect.

The object of the present invention is to provide another means of carrying out the principle by providing an action functional of the rotation itself of the member to be synchronized and an action controlled by the incident voltage.

The accompanying drawing shows a brake control according to the invention.

Reference being had to the drawing, I have shown a metallic disc D which may be the perforate disc of a television receiver and on which acts the driving torque of an induction motor M similar, for example, to that utilized in induction meters.

On the axle XY of the disc, is mounted a commutator C which, for the space of half a revolution, enables the grid of a valve with three or more electrodes to be polarized negatively to a suitable value and, during the other half revolution, to bring said grid to a considerably higher potential, for example that of the filament. This is accomplished by means of a battery P and a resistance R.

The plate current of the valve A will thus undergo considerable variations: in practice, it will be reduced to zero for half a revolution and will have a high value during the following half revolution. The current flowing through the electromagnet E, whose flux acts on the disc, thus produces a considerable braking action for half a revolution. The disc takes up a mean speed which depends on this braking action, the latter being interrupted at each revolution, and on the torque supplied by the coils M generally fed from the mains.

The synchronizing voltage S is applied through the medium of the transformer T which is connected to the grid of the valve (or to another grid if the valve has several grids).

It will be understood that the effect of the synchronizing voltage is to modify the braking action exerted by the electromagnet E on the disc and that it is possible to obtain beat effects which will regulate the speed and rotational phase of the disc as a function of the incidental synchronizing voltage, provided that the speed at which the disc rotates when the synchronizing voltage is not applied differs but slightly from the speed of synchronism.

I claim:

1. In a synchronous device, the combination of a rotatable disc, electromagnetic means for exerting a driving torque on said disc, a source of alternating current for synchronizing said disc, an amplifying valve including a grid on which the synchronizing voltage is applied, electromagnetic means mounted in the plate circuit of said amplifying valve for exerting a braking torque on said disc, a biasing battery, and means controlled by the rotation of said disc for periodically connecting said biasing battery to the grid of said amplifying valve.

2. In a synchronizing device, the combination of a rotatable disc, electromagnetic means for exerting a driving torque on said disc, a source of alternating current for synchronizing said disc, an amplifying valve including a grid on which the synchronizing voltage is applied, electromagnetic means mounted in the plate circuit of said amplifying valve, for exerting a braking torque on said disc, a biasing battery, and a commutator rotated by said disc for periodically connecting said biasing battery to the grid of said amplifying valve.

RENÉ BARTHELEMY.